US012175326B2

(12) United States Patent
Li

(10) Patent No.: US 12,175,326 B2
(45) Date of Patent: Dec. 24, 2024

(54) DISPLAY METHOD, APPARATUS, ELECTRONIC DEVICE, AND READABLE STORAGE MEDIUM

(71) Applicant: VIVO MOBILE COMMUNICATION CO., LTD., Dongguan (CN)

(72) Inventor: Zehan Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/094,969

(22) Filed: Jan. 9, 2023

(65) Prior Publication Data

US 2023/0161990 A1   May 25, 2023

Related U.S. Application Data

(63) Continuation of application No. PCT/CN2021/105402, filed on Jul. 9, 2021.

(30) Foreign Application Priority Data

Jul. 10, 2020   (CN) .......................... 202010661682.6

(51) Int. Cl.
  *G06K 7/14*   (2006.01)
(52) U.S. Cl.
  CPC ......... *G06K 7/1417* (2013.01); *G06K 7/1413* (2013.01)
(58) Field of Classification Search
  CPC ................ G06K 7/1417; G06K 7/1413; G06F 1/1626; G06F 1/1647; G06F 1/3265; G06F 3/04842; G06F 3/04845; G06F 3/0488; G06F 1/3218; G06F 3/0485; G06Q 20/3274
  See application file for complete search history.

(56) References Cited

U.S. PATENT DOCUMENTS

| 10,621,400 B2* | 4/2020 | Tokuchi ............ G06K 19/06037 |
| 2002/0126780 A1* | 9/2002 | Oshima .................. H04H 60/91 |
| | | 705/56 |

(Continued)

FOREIGN PATENT DOCUMENTS

| CN | 105824641 A |   | 8/2016 | |
| CN | 106204027 A | * | 12/2016 | ............. G06F 21/84 |

(Continued)

OTHER PUBLICATIONS

International Search Report issued in corresponding International Application No. PCT/CN2021/105402, mailed Oct. 11, 2021, 4 pages.

(Continued)

*Primary Examiner* — Sonji N Johnson
(74) *Attorney, Agent, or Firm* — IPX PLLC

(57) ABSTRACT

A display method and apparatus, an electronic device, and a non-transitory computer-readable medium are provided. The display method includes: in the case that a graphic code is displayed in a first display region, receiving a first input; in response to the first input, intercepting a target portion of the graphic code, the size of the target portion of the graphic code matching the size of a second display region, and the second display region being located in a side edge screen of the electronic device; and displaying the target portion of the graphic code in the second display region.

18 Claims, 7 Drawing Sheets

(56) References Cited

U.S. PATENT DOCUMENTS

| | | | |
|---|---|---|---|
| 2014/0071023 A1* | 3/2014 | Chu | G06F 3/1454 |
| | | | 345/3.1 |
| 2015/0317060 A1 | 11/2015 | Debets et al. | |
| 2016/0112209 A1* | 4/2016 | Yoon | G06F 21/36 |
| | | | 380/28 |
| 2016/0188197 A1* | 6/2016 | Ryu | G06F 3/017 |
| | | | 345/156 |
| 2016/0292555 A1* | 10/2016 | Malrait | G06K 19/06112 |
| 2018/0225023 A1 | 8/2018 | Li | |

FOREIGN PATENT DOCUMENTS

| | | |
|---|---|---|
| CN | 108229952 A | 6/2018 |
| CN | 109542381 A | 3/2019 |
| CN | 109697494 A | 4/2019 |
| CN | 111131712 A | 5/2020 |
| CN | 111813309 A | 10/2020 |
| EP | 3110113 A1 | 12/2016 |
| KR | 20140121509 A | 10/2014 |

OTHER PUBLICATIONS

First Office Action issued in related Chinese Application No. 202010661682.6, mailed May 19, 2021, 7 pages.
Second Office Action issued in related Chinese Application No. 202010661682.6, mailed Dec. 6, 2021, 5 pages.
Extended European Search Report issued in related European Application No. 21838252.1, mailed Nov. 28, 2023, 8 pages.

\* cited by examiner

DISPLAY METHOD, APPARATUS, ELECTRONIC DEVICE, AND READABLE STORAGE MEDIUM

CROSS-REFERENCE TO RELATED APPLICATIONS

This application is a continuation of International Application No. PCT/CN2021/105402, filed on Jul. 9, 2021, which claims priority to Chinese Patent Application No. 202010661682.6, filed on Jul. 10, 2020. The entire contents of each of the above-identified applications are expressly incorporated herein by reference.

TECHNICAL FIELD

This application relates to the field of communications technologies, and in particular, to a display method, an apparatus, an electronic device, and a readable storage medium.

BACKGROUND

With the continuous development of mobile payment technologies, a mobile payment method has advantages of being convenient, fast, safe, and reliable, so that the mobile payment method is more and more widely used in mobile terminals.

In the related art, a user can display a graphic code on a display screen of an electronic device to be scanned by a scanning terminal. For example, when a mobile payment is used, the user can open a payment application on the electronic device and display a payment code such as a Quick Response (QR) code or a barcode on the display screen of the electronic device, so that the scanning terminal can obtain payment information by scanning the payment code, and complete the mobile payment process based on the payment information. However, the payment code is often displayed on the display screen of the electronic device. After operating on the payment application, the user needs to flip the mobile terminal, so that the display screen of the electronic device faces the scanning terminal for scanning. If the electronic device receives a notification message at this time, the notification message is displayed on the display screen of the electronic device and covers the payment code, resulting in a failure of scanning for the mobile payment, so that the user might need to repeatedly operate the electronic device to display the payment code. This makes the operation troublesome.

It can be learned that the method of displaying a graphic code in the related art has a disadvantage of cumbersome operation.

SUMMARY

Embodiments of this application are intended to provide a display method, an apparatus, an electronic device, and a readable storage medium.

According to a first aspect, an embodiment of this application provides a display method, where the method includes:

in a case that a graphic code is displayed in a first display area, receiving a first input;
in response to the first input, capturing a target part of the graphic code, where a size of the target part of the graphic code matches a size of a second display area, and the second display area is located in a side screen of an electronic device; and displaying the target part of the graphic code in the second display area.

According to a second aspect, an embodiment of this application provides a display, apparatus, including:

an input module, configured to, in a case that a graphic code is displayed in a first display area, receive a first input;
a capture module, configured to, in response to the first input, capture a target part of the graphic code, where a size of the target part of the graphic code matches a size of a second display area, and the second display area is located in a side screen of an electronic device; and
a first display module, configured to display the target part of the graphic code in the second display area.

According to a third aspect, an embodiment of this application provides an electronic device, where the electronic device includes a processor, a memory, and a program or an instruction stored in the memory and capable of running on the processor, and when the program or the instruction is executed by the processor, the steps of the method according to the first aspect are implemented.

According to a fourth aspect, an embodiment of this application provides a readable storage medium, where the readable storage medium stores a program or an instruction, and when the program or the instruction is executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or an instruction, to implement the method according to the first aspect.

In embodiments of this application, in a case that a graphic code is displayed in a first display area, a first input is received; in response to the first input, a target part of the graphic code is captured, where a size of the target part of the graphic code matches a size of a second display area, and the second display area is located in a side screen of an electronic device; and the target part of the graphic code is displayed in the second display area.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in the specification and claims of this application are used to distinguish between similar objects instead of describing a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and a character "/" generally represents an "or" relationship between associated objects.

The following describes in detail the display method, the display apparatus, and the electronic device provided in the embodiments of this application through specific embodiments and application scenarios thereof with reference to the accompanying drawings.

Figure 1:
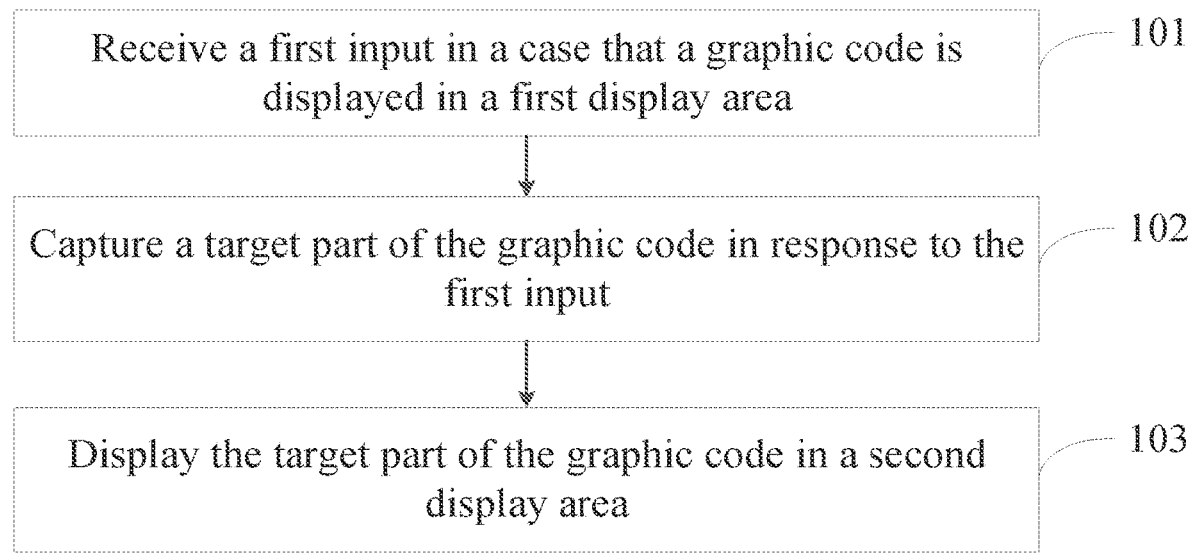
FIG. 1 is a flowchart of a display method according to an embodiment of this application.

FIG. 1 is a flowchart of a display method according to an embodiment of this application. As shown in FIG. 1, the display method may include the following steps.

Step 101: in a case that a graphic code is displayed in a first display area, receive a first input.

Step 102: In response to the first input, capture a target part of the graphic code, where a size of the target part of the graphic code matches a size of a second display area, and the second display area is located in a side screen of an electronic device.

Step 103: Display the target part of the graphic code in the second display area.

In some implementations, the foregoing graphic code may be a barcode, a QR code, and the like. This is not specifically limited herein. In some implementations, the graphic code carries data information, and an application process matching the information carried in the graphic code can be performed by scanning the graphic code. For example, if the graphic code is a payment code, a payment amount can be collected from a payment account based on the payment information carried in the payment code by scanning the payment code. In some implementations, if the graphic code is a QR code business card of a social media account, by scanning the QR code business card, a communication connection with a target social media account can be established based on the social media account information carried in the QR code business card.

In addition, the above first input may be a touch input, for example, one or more combinations of touch operations such as a click, a double click, a slide on a touch screen. In some implementations, the first input may further be an operation of hardware buttons on an electronic device. This is not specifically limited herein.

In some implementations, the first display area and the second display area are not in the same plane. In some implementations, the first display area is located in a main screen of the electronic device, the second display area is located in a side screen of the electronic device, and an included angle between the vertical line of the main screen and the vertical line of the side screen is greater than 0° and less than or equal to 90°. In some implementations, the second display area may further be a curved display area, such as a curved side screen surrounding a main screen of an electronic device. In some implementations, the second display area may further be a plane display area, such as a side screen on a waterfall-screen phone that is perpendicular to the main screen.

It should be noted that a size of the target part of the graphic code matches a size of a second display area means that a length of the target part is equal to a length of the graphic code, and a width of the target part is less than or equal to a width of the second display area.

In some implementations, in a case that the graphic code is a barcode, a length direction of the barcode is perpendicular to a longer side of the black stripe in the barcode.

In this embodiment, decoding of the barcode is only related to a width of the black stripe and spacing of a blank area between every two black stripes, but not to an overall width of the barcode. The width of the black stripe and the width of the blank area in the target part of the barcode captured in this embodiment are the same as that of the barcode, so that the captured target part of the barcode can be identified. Because the length of the target part of the captured barcode is the same as the length of the barcode, the information carried by the target part of the barcode is consistent with the information carried by the barcode, so that it is unnecessary to capture and display the barcode for many times. A length direction of the target part is parallel to a direction of a shorter side of the black stripe.

Figure 2:
FIG. 2 is a first diagram of an application scenario of a display method according to an embodiment of this application.

In addition, in some implementations, the second display area may be a rectangular area with a large ratio of length to width, and the target part of the graphic code carries all the information carried by the graphic code. For example, in a case that the graphic code is a barcode as shown in FIG. 2, the barcode includes a plurality of black stripes 21, and black stripes 21 have different widths and are spaced apart. The black stripes 21 that are spaced apart extend in a same direction. A target part 22 is a part of the barcode captured in a direction perpendicular to a longer side of the black stripe 21, and a length of the target part 22 is equal to the length of the barcode. A width of the target part 22 is less than or equal to the width of the second display area.

Figure 3:
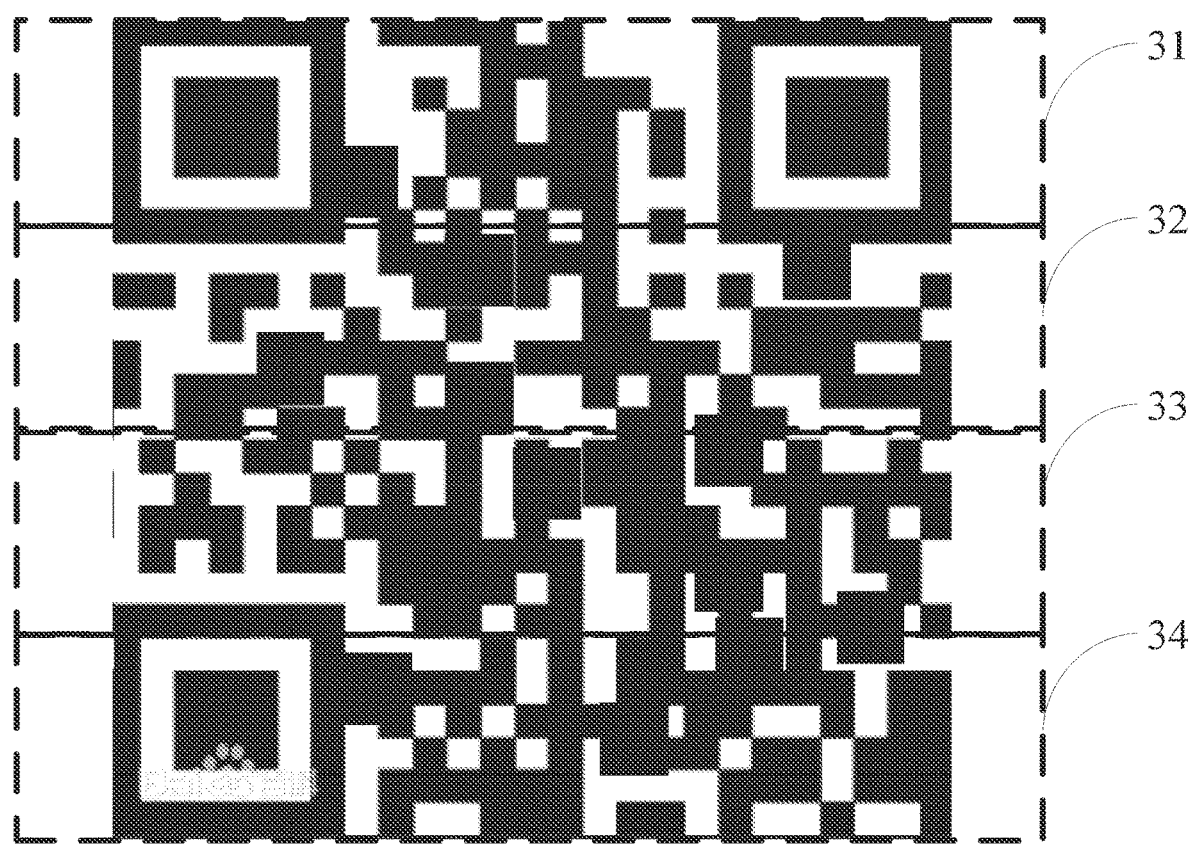
FIG. 3 is a second diagram of an application scenario of a display method according to an embodiment of this application.

In addition, in a case that the graphic code is a QR code, the QR code is divided into a plurality of sub images arranged in a second direction, and is displayed in an order in which the plurality of sub images are arranged in the second direction in the second display area. For example, as shown in FIG. 3, the QR code is divided into a first sub image 31, a second sub image 32, a third sub image 33, and a fourth sub image 34 in an order from top to bottom (the second direction), and sizes of the first sub image 31, the second sub image 32, the third sub image 33, and the fourth sub image 34 are all less than or equal to the sizes of the second display area. During a process of displaying the QR code, the four sub images can be displayed in the second display area in an order of the first sub image 31, the second sub image 32, the third sub image 33, and the fourth sub image 34, or in an order of the fourth sub image 34, the third sub image 33, the second sub image 32, and the first sub image 31.

The second direction may be a direction perpendicular to the longer side of the second display area, and the length of the shorter side of each sub image is less than or equal to the width of the second display area. For example, the second display area is a side screen placed transversely on the electronic device, such as an upper side screen or a lower side screen, and the second direction may be a longitudinal direction of the electronic device. In this case, the shorter side of each sub image extends in a longitudinal direction, and the length of the shorter side is less than or equal to a longitudinal width of the second display area.

It should be noted that the plurality of sub images displayed in multiple times in the second display area carry the information carried by the QR code. For example, in a case that the graphic code is a QR code as shown in FIG. 3 and the QR code is in a square, the QR code can be divided into a plurality of sub images (31, 32, 33, and 34) from top to bottom, and each sub image (31, 32, 33, and 34) can be displayed in the second display area from top to bottom. The length of each sub image (31, 32, 33, and 34) is less than or equal to the length of the second display area, and the width of each sub image (31, 32, 33, and 34) is less than or equal to the width of the second display area. In this case, the scanning terminal can scan several times to obtain each sub image displayed in the second display area, and then piece together the sub images (31, 32, 33, and 34) in an order of the sub images (31, 32, 33, and 34) displayed in the second display area to form the complete QR code, so as to scan and respond based on the data information carried in the QR code.

In this embodiment, the QR code is divided into a plurality of sub images and then displayed in the second display area in sequence. The QR code with a larger size can be displayed on a side screen with a smaller size, and the QR code displayed on the side screen has high definition.

In some implementations, other side screens such as a curved display area or a waterfall screen may be disposed at edges of the main screen of the electronic device. When the graphic code is displayed on the main screen, the side screen on which the graphic code is displayed can be determined based on the first input. For example, in a case that the first input is a slide input, the target side screen can be determined based on a sliding direction of the slide input, and the graphic code is displayed on the target side screen.

In some implementations, the first input is a slide input, and the capturing a target part of the graphic code in response to the first input includes:

in response to the first input, obtaining a sliding direction of the first input;

determining a target side screen based on the sliding direction of the first input, and obtaining a size parameter of the target side screen, where the side screen of the electronic device includes the target side screen; and capturing the target part of the graphic code based on the size parameter.

For example, when a user's finger slides upward on the main screen, the graphic code displayed on the main screen can be captured, and a part of the captured graphic code can be displayed in the upper side screen. When the user's finger slides to the left on the main screen, the part of the graphic code can be displayed on the left side screen.

It should be understood that if sizes of side screens are different, the size of the captured graphic code is also different.

Figure 4:
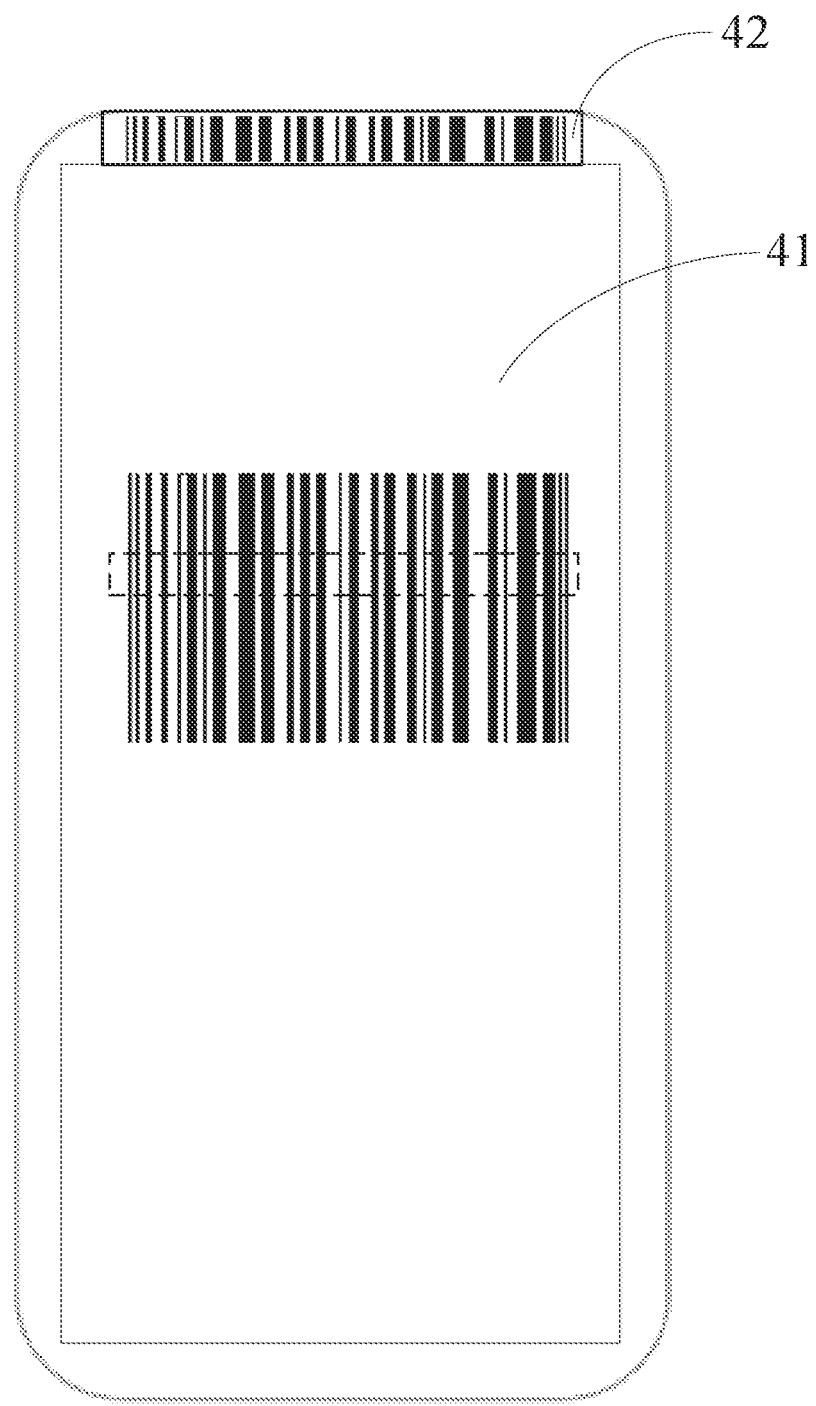
FIG. 4 is a flowchart of another display method according to an embodiment of this application.

In some implementations, the determining a target side screen based on the sliding direction of the first input may be: determining the target side screen to be a side screen to which the slide input points. For example, in a case that the first input is an upward slide input as shown in FIG. 4, the target side screen is a side screen 42 located on the upper side of the main screen 41.

In some implementations, the side screen can be disposed on a plurality of sides of the electronic device. For example, the side screen can be disposed on the upper side, left side and right side of a mobile phone.

In some implementations, shapes and sizes of different side screens may be different. For example, the length of the longer side screen of the electronic device is greater than the length of the shorter side screen of the electronic device.

In addition, size parameters of the target side screen may include a ratio of the length of the target side screen to the width of the target side screen. In some implementations, the capturing the target part of the graphic code based on the size parameter may be that a ratio of the length of the target part to the width of the target part may be the same as the ratio of the length of the target side screen to the width of the target side screen.

In this embodiment, the target part of the graphic code can be displayed in a side screen corresponding to the first input, so that the user can adjust a display position of the target part of the graphic code based on different handheld modes, application environments, and the like, to improve flexibility of the display method.

In some implementations, the above first input may further be a double click, a heavy press, a click, and other inputs. The double click, the heavy press, and the click may be associated with the side screen of the electronic device in one-to-one correspondence to display the graphic code in the target side screen associated with the first input when the first input is received.

In this way, when the user needs to show the graphic code to be scanned by the scanning terminal, at least a part of the graphic code can be displayed in the second display area through the first input, and other interfaces can be displayed in the first display area, such as an application interface before displaying the graphic code, or the user can switch to other display interfaces through operations. In this way, it is not necessary to display the graphic code in the first display area all the time to prevent the user from operating and viewing the electronic device.

In addition, when the user scans the graphic code with the second display area facing the scanning terminal, if the electronic device receives a notification message, the notification message is displayed in the first display area. Since the second display area and the first display area are not in the same plane, other users near the scanning terminal cannot easily view the content displayed in the first display area, thereby protecting the user's information security, and improving privacy of electronic device.

In some implementations, the graphic code may be a graphic code generated by a target application program. Before the displaying the target part of the graphic code in the second display area, the method further includes:

receiving a second input by a user on the target application program; and in response to the second input, in a case that the graphic code is displayed on an interface of the target application program, capturing a target part of the graphic code and displaying the target part of the graphic code on the second display area.

In some implementations, the above second input may be an operation for displaying all the target parts of the graphic code in the target application interface in the second display area, or may be a setting operation in the setting interface of the target application and the like. Details are not described herein.

In this embodiment, the graphic code displayed in the target application program interface can be moved to the second display area through the second input, thereby reducing an operation process of the user executing the first input and simplifying operation steps of the display method.

In this embodiment of this application, in a case that a graphic code is displayed in a first display area, a first input is received; in response to the first input, a target part of the graphic code is captured, where a size of the target part of the graphic code matches a size of a second display area, and the second display area is located in a side screen of an electronic device; and the target part of the graphic code is displayed in the second display area. In this way, the target part of the graphic code in the first display area can be captured first, and the target part of the graphic code can be moved to the side screen of the electronic device for display, so that when the electronic device receives a notification message, the notification message is displayed in the first display area, and the notification message does not cover the target part of the graphic code in the second display area.

Figure 5:
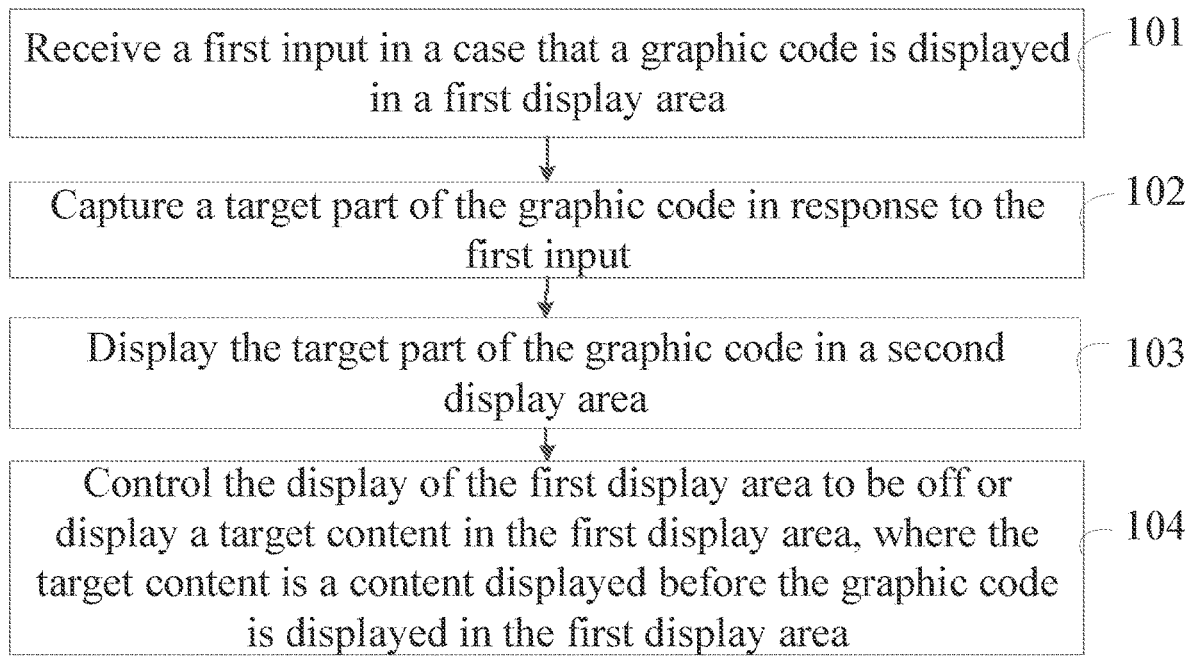
FIG. 5 is a diagram of an application scenario of another display method according to an embodiment of this application.

FIG. 5 is a flowchart of another display method according to an embodiment of this application. A difference between the display method provided in this embodiment of this application and the display method provided in the embodiment shown in FIG. 1 is that after the target part of the graphic code is displayed in the second display area, the method also includes that the display of the first display area is off, or a target content is displayed in the first display area.

In some implementations, as shown in FIG. 5, after step 103, the display method may further include the following operation step.

Step 104: Control the display of the first display area to be off or display a target content in the first display area, where the target content is a content displayed in the first display area before the graphic code is displayed in the first display area.

In some implementations, the controlling the display of the first display area to be off may be adjusting a brightness value of the first display area to 0.

In some implementations, in a case that step 104 is used to control the display of the first display area to be off, after step 104, the above method may further include controlling the first display area to be turned on, when scanning response information of the target part of the graphic code in the second display area is received. In a case that the first display area is turned on, the first display area can display a display interface before displaying the graphic code.

The controlling the first display area to be turned on may be understood as adjusting the brightness value of the first display area to the brightness value before the screen is off.

It should be noted that the above scanning response information of the target part of the graphic code in the second display area may be response information that the scanning terminal successfully scans the target part of the graphic code, such as response information of successful payment in the process of scanning the payment code for payment. In some implementations, the above scanning response information of the target part of the graphic code in the second display area may further be the response information of the scanning terminal obtaining the target part of the graphic code, for example, the information sent by the scanning terminal to the electronic device displaying the graphic code after scanning the target part of the graphic code to inform the electronic device to obtain the graphic code.

In some implementations, in a case that the first display area is a touch screen, after the display of the first display area is controlled to be off, the first display area can also be controlled to be turned on when a touch operation is received on the touch screen.

In this way, when the electronic device displays the target part of the graphic code through the second display area to wait for the scanning terminal to scan, the user can control the first display area to be turned on through a touch operation, so as to facilitate the input operation or viewing of the display content in the first display area, without interfering with the target part of the graphic code displayed in the second display area.

It should be noted that, the display method provided in this embodiment of this application may be performed by a display apparatus or a control module that is in the display apparatus and that is configured to perform the display method. In this embodiment of this application, an example in which the display apparatus executes and loads the display method is used to describe the display apparatus provided in this embodiment of this application.

Figure 6:
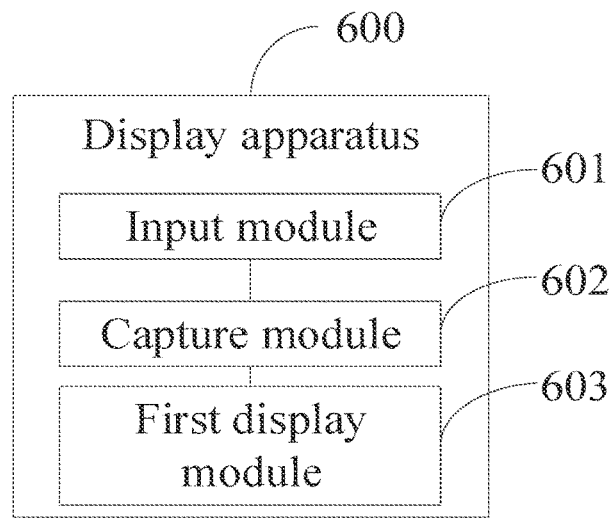
FIG. 6 is a first structural diagram of a display apparatus according to an embodiment of this application.

FIG. 6 is a structural diagram of a display apparatus according to this application. As shown in FIG. 6, the display apparatus 600 includes:
- an input module 601, configured to, in a case that a graphic code is displayed in a first display area, receive a first input;
- a capture module 602, configured to, in response to the first input, capture a target part of the graphic code, where a size of the target part of the graphic code matches a size of a second display area, and the second display area is located in a side screen of an electronic device; and
- a first display module 603, configured to display the target part of the graphic code in the second display area.

Figure 7:
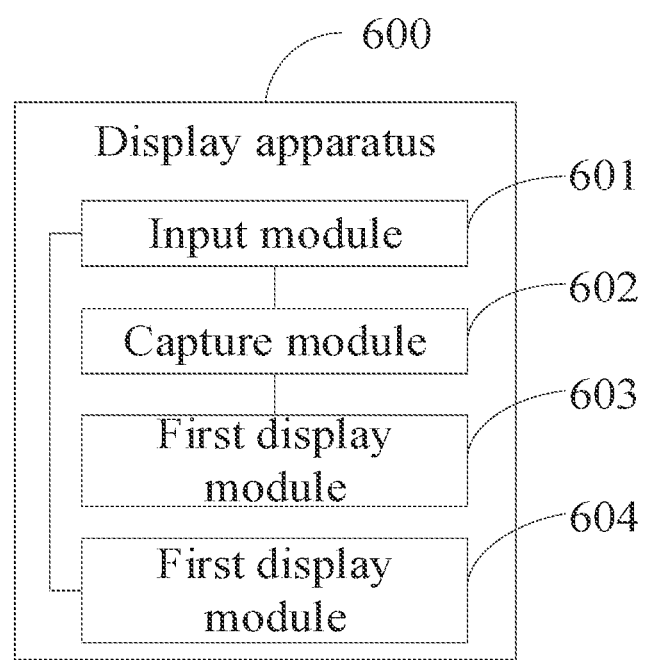
FIG. 7 is a second structural diagram of a display apparatus according to an embodiment of this application.

In some implementations, as shown in FIG. 7, the display apparatus 600 further includes:
- a second display module 604, configured to control the display of the first display area to be off or display a target content in the first display area.

The target content is a content displayed in the first display area before the graphic code is displayed in the first display area. In some implementations, in a case that the graphic code is a barcode, the target part of the graphic code is a part of the barcode captured in a first direction.

The first direction is perpendicular to a longer side of a black stripe in the barcode. In some implementations, in a case that the graphic code is a QR code, the capture module 602 is configured to:
- in response to the first input, divide the QR code into a plurality of sub images, where a size of each sub image in the plurality of sub images matches the size of the second display area.

The first display module 603 is configured to:
- display the plurality of sub images in the second display area in a preset order.

Figure 8:
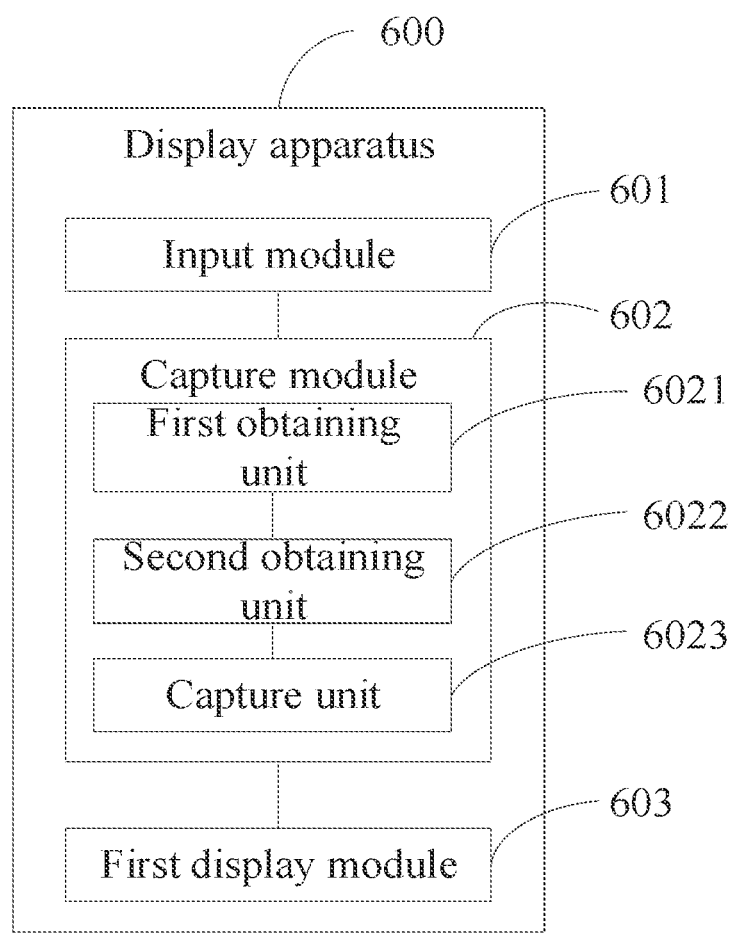
FIG. 8 is a third structural diagram of a display apparatus according to an embodiment of this application.

In some implementations, the first display area is a main screen of the electronic device. The second display area is a side screen of the electronic device. The first input is a slide input. As shown in FIG. 8, the capture module 602 includes:
- a first obtaining unit 6021, configured to, in response to the first input, obtain a sliding direction of the first input;

a second obtaining unit 6022, configured to determine a target side screen based on the sliding direction of the first input, and obtain a size parameter of the target side screen, where the side screen of the electronic device includes the target side screen; and a capture unit 6023, configured to capture the target part of the graphic code based on the size parameter.

The display apparatus provided in this embodiment of this application can implement the processes of the method embodiments of this application, and can implement the same beneficial effects. To avoid repetition, details are not described herein again.

The display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted terminal, a wearable device, an Ultra-Mobile Personal Computer (UMPC), a netbook, a Personal Digital Assistant (PDA), or the like. The non-mobile electronic device may be a server, a Network Attached Storage (NAS), a personal computer, a television, a teller machine, a self-service machine, or the like. This is not specifically limited in the embodiments of this application.

The display apparatus in the embodiments of this application may be an apparatus with an operating system. The operating system may be an Android operating system, may be an iOS operating system, or may be another possible operating system, which is not specifically limited in the embodiments of this application.

The display apparatus provided in this embodiment of this application can implement the processes implemented in the method embodiment in FIG. 1 or FIG. 4. To avoid repetition, details are not described herein again.

Figure 9:
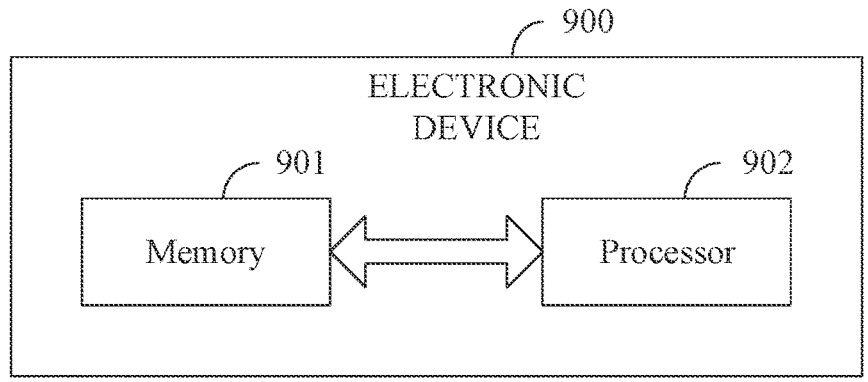
FIG. 9 is a structural diagram of an electronic device according to an embodiment of this application.

In some implementations, as shown in FIG. 9, an embodiment of this application further provides an electronic device 900, including a processor 901, a memory 902, and a program or an instruction stored in the memory 902 and capable of running on the processor 901. When the program or the instruction is executed by the processor 901, the processes of the foregoing display method embodiments are implemented, with the same technical effects achieved. To avoid repetition, details are not described herein again.

It should be noted that the electronic device in this embodiment of this application includes the foregoing mobile electronic device and the foregoing non-mobile electronic device.

Figure 10:
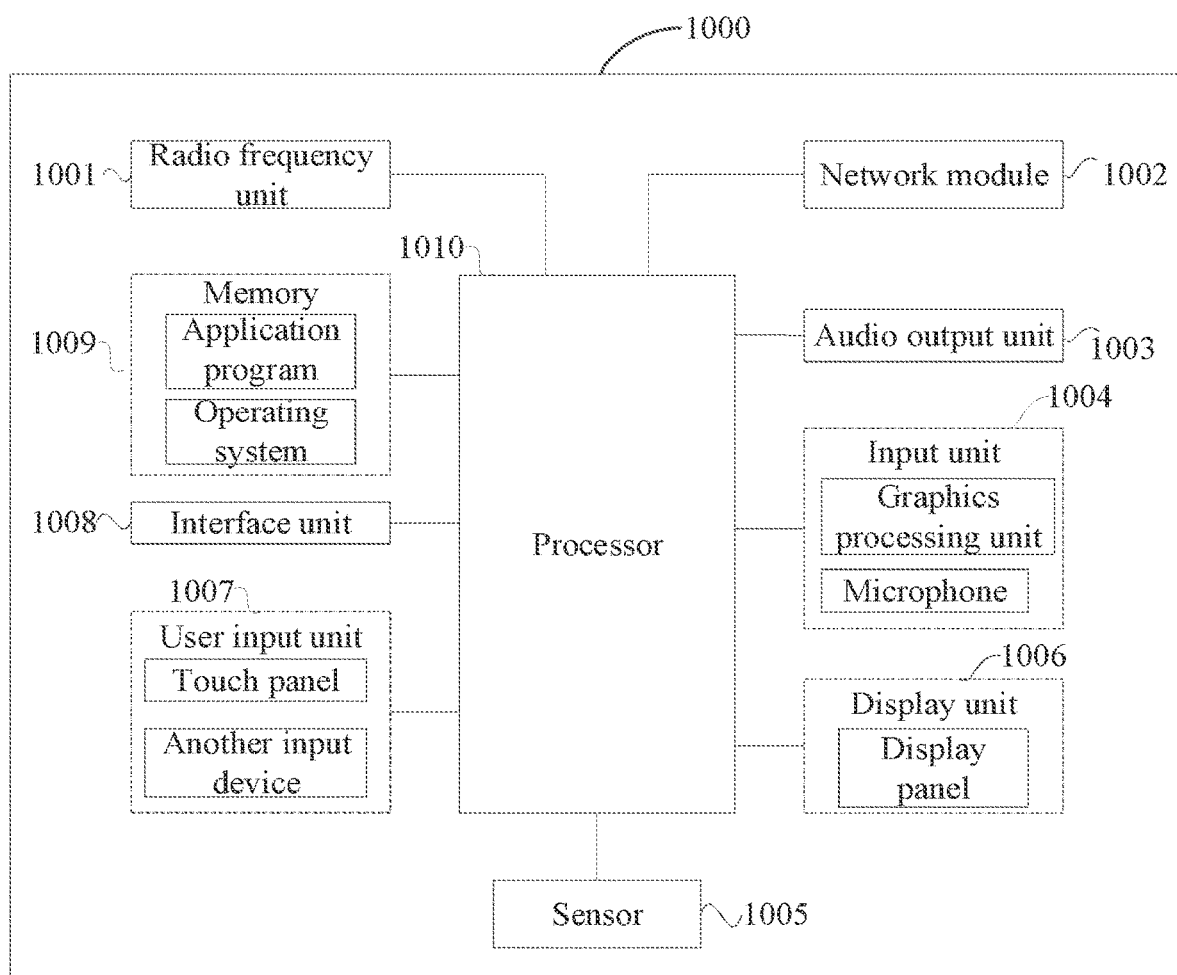
FIG. 10 is a structural diagram of another electronic device according to an embodiment of this application.

FIG. 10 is a schematic diagram of a hardware structure of an electronic device according to an embodiment of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (for example, a battery) that supplies power to the components. The power supply may be logically connected to the processor 1010 by using a power management system, so as to implement functions such as charging management, discharging management, and power consumption management by using the power management system. The electronic device is not limited to the electronic device structure shown in FIG. 10. The electronic device may include more or fewer components than those shown in the figure, or combine some of the components, or arrange the components differently. Details are not described herein.

The user input unit 1007 is configured to, in a case that a graphic code is displayed in a first display area, receive a first input.

The processor 1010 is configured to, in response to the first input, capture a target part of the graphic code, where a size of the target part of the graphic code matches a size of a second display area, and the second display area is located in a side screen of an electronic device.

The display unit 1006 is configured to display the target part of the graphic code in the second display area.

In this implementation, when the electronic device receives a notification message, the notification message is displayed in the first display area, so that the notification message does not cover the target part of the graphic code in the second display area, thereby avoiding a problem that the notification message covers the barcode in the first display area, causing a failure of scanning the barcode, so that repeated operations are needed to display the barcode.

In some implementations, after the displaying the target part of the graphic code in the second display area, the display unit 1006 is further configured to:

control the display of the first display area to be off or display a target content in the first display area.

The target content is a content displayed in the first display area before the graphic code is displayed in the first display area.

In some implementations, in a case that the graphic code is a barcode, the target part of the graphic code is a part of the barcode captured in a first direction.

The first direction is perpendicular to a longer side of a black stripe in the barcode.

In some implementations, in a case that the graphic code is a QR code, that the processor 1010 performs capturing a target part of the graphic code in response to the first input includes:

in response to the first input, dividing the QR code into a plurality of sub images, where a size of each sub image in the plurality of sub images matches the size of the second display area.

That the display unit 1006 performs displaying the target part of the graphic code in the second display area includes:

display the plurality of sub images in the second display area in a preset order.

In some implementations, the first input is a slide input. That the processor 1010 performs capturing a target part of the graphic code in response to the first input includes:

in response to the first input, obtaining a sliding direction of the first input;

determining a target side screen based on the sliding direction of the first input, and obtaining a size parameter of the target side screen, where the side screen of the electronic device includes the target side screen; and capturing the target part of the graphic code based on the size parameter.

The electronic device provided in this embodiment of this application can implement the processes in the method embodiment provided in FIG. 1 or FIG. 4, and can achieve the same beneficial effects. To avoid repetition, details are not described herein again.

It should be understood that in this embodiment of this application, the input unit 1004 may include a Graphics Processing Unit (GPU) and a microphone, and the graphics processing unit processes image data of a still picture or a video obtained by an image capture apparatus (for example, a camera) in an image capture mode or a video capture mode. The display unit 1006 may include a display panel. The display panel may be configured in a form of a liquid crystal display, an organic light-emitting diode, or the like. The user input unit 1007 includes a touch panel and another input device. The touch panel is also called a touch screen. The touch panel may include two parts: a touch detection apparatus and a touch controller. The another input device may include but is not limited to a physical keyboard, a functional button (such as a volume control button or a power on/off button), a trackball, a mouse, and a joystick. Details are not described herein. The memory 1009 may be configured to store a software program and various data, including but not limited to an application program and an operating system. The processor 1010 may be integrated with an application processor and a modem processor. The application processor mainly processes an operating system, a user interface, an application program, and the like, and the modem processor mainly processes wireless communication. It can be understood that, in some implementations, the modem processor may not be integrated into the processor 1010.

An embodiment of this application further provides a readable storage medium, where the readable storage medium stores a program or an instruction, and when the program or the instruction is executed by a processor, the processes of the foregoing display method embodiments are implemented, with the same technical effect achieved. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, or an optical disc.

An embodiment of this application also provides a chip. The chip includes a processor and a communications interface, and the communications interface is coupled to the processor. The processor is configured to run a program or an instruction to implement various processes of the foregoing display method embodiments, with the same technical effects achieved. To avoid repetition, details are not described herein again.

It should be understood that the chip mentioned in this embodiment of the present application may also be referred to as a system-level chip, a system chip, a system on chip, a system chip on chip, and the like.

It should be noted that in this specification, the term "include," "comprise," or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not preclude the presence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fail within the protection scope of this application.

The invention claimed is:

1. A display method, comprising:
when a standalone graphic code is displayed in a first display area, receiving a first input;
in response to the first input, capturing a target part of the graphic code as a sub region within the graphic code, wherein a size of the target part of the graphic code matches a size of a second display area, and the second display area is located in a side screen of an electronic device; and
displaying the target part of the graphic code in the second display area, wherein
when the graphic code is a Quick Response (QR) code, displaying the target part of the graphic code in the second display area comprises:
sequentially displaying a plurality of sub images of the QR code in the second display area in an order in which the plurality of sub images are arranged in a first direction in the QR code,
wherein the first direction is perpendicular to a longer side of the second display area, and a length of a shorter side of each sub image is less than or equal to a width of the second display area.

2. The method according to claim 1, wherein after the displaying graphic code in the second display area, the method further comprises:
controlling the display of the first display area to be off or displaying a target content in the first display area, wherein
the target content is a content displayed in the first display area before the graphic code is displayed in the first display area.

3. The method according to claim 1, wherein when the graphic code is a barcode comprising a plurality of black stripes, the target part of the graphic code includes a subset of the black stripes in the barcode captured in a second direction, wherein
the second direction is perpendicular to a longer side of the black stripes in the barcode.

4. The method according to claim 1, wherein when the graphic code is a Quick Response (QR) code, the capturing a target part of the graphic code in response to the first input and the displaying the target part of the graphic code in the second display area comprise:

in response to the first input, dividing the QR code into the plurality of sub images in the first direction, wherein a size of each sub image in the plurality of sub images matches the size of the second display area.

5. The method according to claim 1, wherein the first input is a slide input, and the capturing a target part of the graphic code in response to the first input comprises:

in response to the first input, obtaining a sliding direction of the first input;

determining a target side screen based on the sliding direction of the first input, and obtaining a size parameter of the target side screen, wherein the side screen of the electronic device comprises the target side screen; and capturing the target part of the graphic code based on the size parameter.

6. The method according to claim 1, wherein that a size of the target part of the graphic code matches a size of a second display area means that a length of the target part is equal to a length of the graphic code, and a width of the target part is less than or equal to a width of the second display area.

7. The method according to claim 1, further comprising:

during a process that a graphic code of the second display area is scanned, when a notification message is received, displaying the notification message in the first display area.

8. An electronic device, comprising:

a memory storing computer-readable instructions; and a processor coupled to the memory and configured to execute the computer-readable instructions, wherein the computer-readable instructions, when executed by the processor, cause the processor to perform the operations comprising:

when a standalone graphic code is displayed in a first display area, receiving a first input;

in response to the first input, capturing a target part of the graphic code as a sub region within the graphic code, wherein a size of the target part of the graphic code matches a size of a second display area, and the second display area is located in a side screen of the electronic device; and displaying the target part of the graphic code in the second display area, wherein when the graphic code is a Quick Response (OR) code, displaying the target part of the graphic code in the second display area comprises:

sequentially displaying a plurality of sub images of the QR code in the second display area in an order in which the plurality of sub images are arranged in a first direction in the QR code, wherein the first direction is perpendicular to a longer side of the second display area, and a length of a shorter side of each sub image is less than or equal to a width of the second display area.

9. The electronic device according to claim 8, wherein after the displaying graphic code in the second display area, the operations further comprise:

controlling the display of the first display area to be off or displaying a target content in the first display area, wherein the target content is a content displayed in the first display area before the graphic code is displayed in the first display area.

10. The electronic device according to claim 8, wherein when the graphic code is a barcode comprising a plurality of black stripes, the target part of the graphic code includes a subset of the black stripes in the barcode captured in a second direction, wherein the second direction is perpendicular to a longer side of the black stripes in the barcode.

11. The electronic device according to claim 8, wherein when the graphic code is a Quick Response (QR) code, the capturing a target part of the graphic code in response to the first input and the displaying the target part of the graphic code in the second display area comprise:

in response to the first input, dividing the QR code into the plurality of sub images in the first direction, wherein a size of each sub image in the plurality of sub images matches the size of the second display area.

12. The electronic device according to claim 8, wherein the first input is a slide input, and the capturing a target part of the graphic code in response to the first input comprises:

in response to the first input, obtaining a sliding direction of the first input;

determining a target side screen based on the sliding direction of the first input, and obtaining a size parameter of the target side screen, wherein the side screen of the electronic device comprises the target side screen; and capturing the target part of the graphic code based on the size parameter.

13. The electronic device according to claim 8, wherein that a size of the target part of the graphic code matches a size of a second display area means that a length of the target part is equal to a length of the graphic code, and a width of the target part is less than or equal to a width of the second display area.

14. The electronic device according to claim 8, wherein the operations further comprise:

during a process that a graphic code of the second display area is scanned, when a notification message is received, displaying the notification message in the first display area.

15. A non-transitory computer-readable medium storing instructions that, when executed by a processor, cause the processor to perform operations comprising:

when a standalone graphic code is displayed in a first display area, receiving a first input;

in response to the first input, capturing a target part of the graphic code as a sub region within the graphic code, wherein a size of the target part of the graphic code matches a size of a second display area, and the second display area is located in a side screen of an electronic device; and displaying the target part of the graphic code in the second display area, wherein when the graphic code is a Quick Response (QR) code, displaying the target part of the graphic code in the second display area comprises:

sequentially displaying a plurality of sub images of the QR code in the second display area in an order in which the plurality of sub images are arranged in a first direction in the QR code, wherein the first direction is perpendicular to a longer side of the second display area, and a length of a shorter side of each sub image is less than or equal to a width of the second display area.

16. The non-transitory computer-readable medium according to claim 15, wherein after the displaying graphic code in the second display area, the operations further comprise:
- controlling the display of the first display area to be off or displaying a target content in the first display area, wherein
- the target content is a content displayed in the first display area before the graphic code is displayed in the first display area.

17. The non-transitory computer-readable medium according to claim 15, wherein when the graphic code is a barcode comprising a plurality of black stripes, the target part of the graphic code includes a subset of the black stripes in the barcode captured in a second direction, wherein
- the second direction is perpendicular to a longer side of the black stripes in the barcode.

18. The non-transitory computer-readable medium according to claim 15, wherein when the graphic code is a Quick Response (QR) code, the capturing a target part of the graphic code in response to the first input and the displaying the target part of the graphic code in the second display area comprise:
- in response to the first input, dividing the QR code into the plurality of sub images in the first direction, wherein a size of each sub image in the plurality of sub images matches the size of the second display area.

* * * * *